(12) United States Patent
Beswick et al.

(10) Patent No.: US 8,087,428 B1
(45) Date of Patent: Jan. 3, 2012

(54) HIGH PRESSURE INLET REGULATOR

(75) Inventors: Paul R. Beswick, Newington, NH (US); Gary A. Treadwell, Dover, NH (US)

(73) Assignee: Beswick Engineering Co., Inc., Greenland, NH (US)

( * ) Notice: Subject to any disclaimer, the term of this patent is extended or adjusted under 35 U.S.C. 154(b) by 0 days.

(21) Appl. No.: 11/999,941

(22) Filed: Dec. 7, 2007

Related U.S. Application Data

(60) Provisional application No. 60/873,870, filed on Dec. 7, 2006.

(51) Int. Cl.
*F16K 31/12* (2006.01)

(52) U.S. Cl. ......... 137/505.12; 137/505.29; 137/505.37; 137/613

(58) Field of Classification Search ............. 137/505.12, 137/505.18, 505.26, 505.27, 505.28, 505.29, 137/505.36, 505.37
See application file for complete search history.

(56) References Cited

U.S. PATENT DOCUMENTS

| | | | | |
|---|---|---|---|---|
| 2,082,227 A * | 6/1937 | Stettner | ........................ | 137/328 |
| 2,565,560 A * | 8/1951 | Jacobsson | ....................... | 137/12 |
| 2,721,576 A * | 10/1955 | Grove et al. | ............ | 137/505.28 |
| 2,739,611 A | 3/1956 | Cornelius | | |
| 3,100,504 A * | 8/1963 | Kauer, Jr. | ....................... | 137/494 |
| 3,111,962 A * | 11/1963 | Cox et al. | .................. | 137/505.18 |
| 3,656,508 A * | 4/1972 | Boychuk et al. | .............. | 137/495 |
| 3,722,536 A | 3/1973 | Hill et al. | .................. | 137/505.46 |
| 4,182,368 A | 1/1980 | Hartley | ..................... | 137/596.17 |
| 5,113,898 A | 5/1992 | White et al. | ................ | 137/454.5 |
| 5,411,053 A * | 5/1995 | Markham et al. | ......... | 137/505.28 |
| 7,059,343 B2 * | 6/2006 | Carroll | ..................... | 137/505.25 |
| 7,712,482 B2 * | 5/2010 | Nomichi et al. | .......... | 137/505.18 |

FOREIGN PATENT DOCUMENTS

GB 708642 4/1952

* cited by examiner

*Primary Examiner* — John Fristoe, Jr.
(74) *Attorney, Agent, or Firm* — Lorusso & Associates

(57) ABSTRACT

A two-stage regulator having a piston situated in a first stage for substantially reducing high pressures introduced into the regulator. The reduced pressure is exerted against the second stage that includes a plunger-actuated diaphragm that urges an actuator to open a ball valve at a selected pressure to allow fluid to flow out of the regulator at a desired reduced pressure.

20 Claims, 14 Drawing Sheets

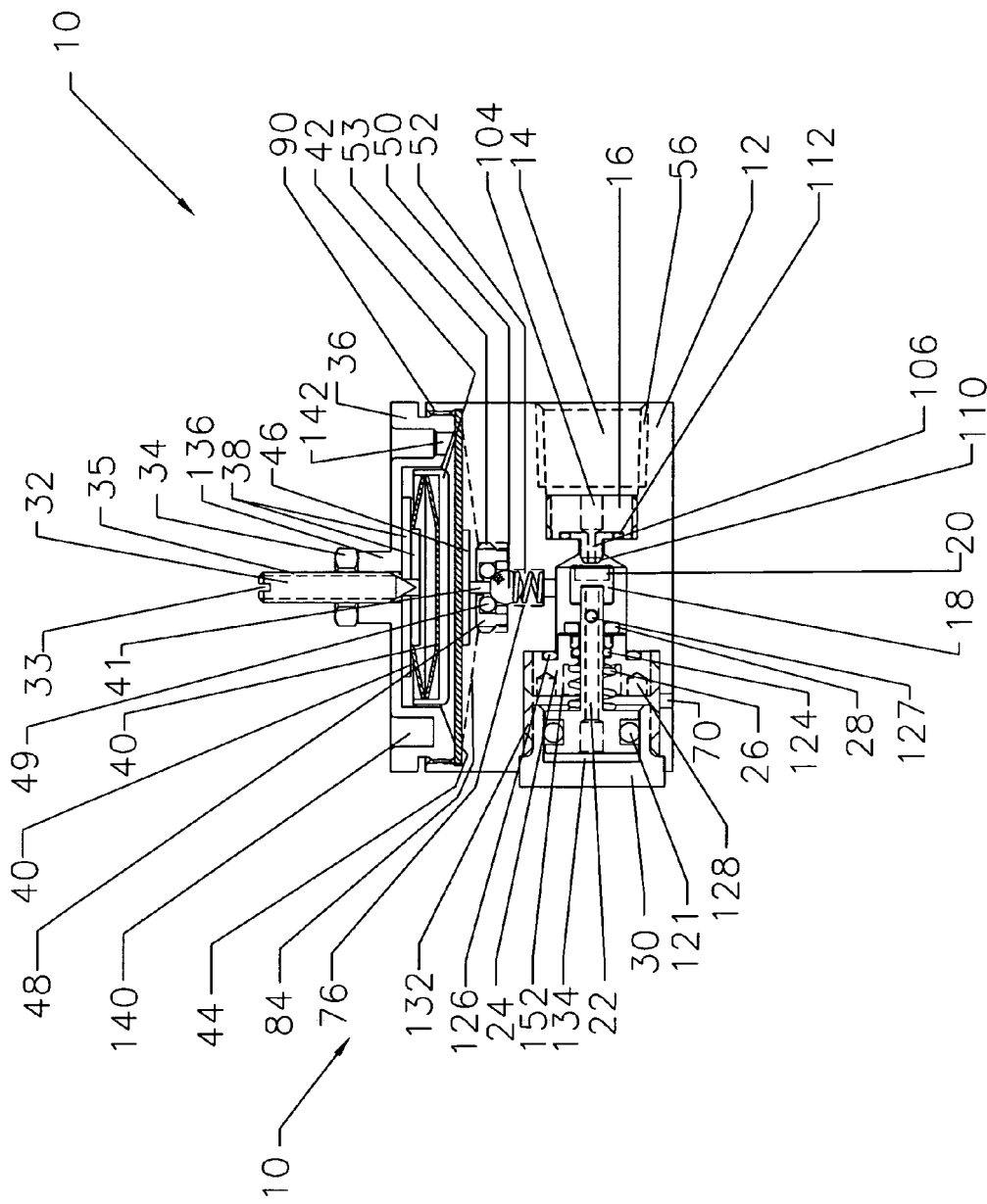

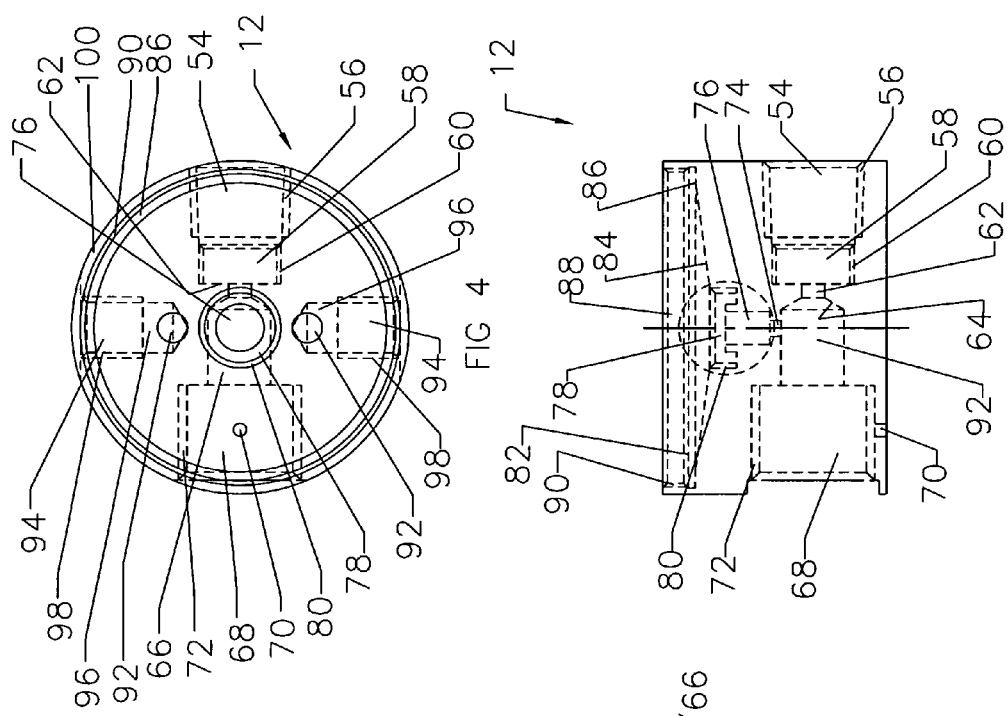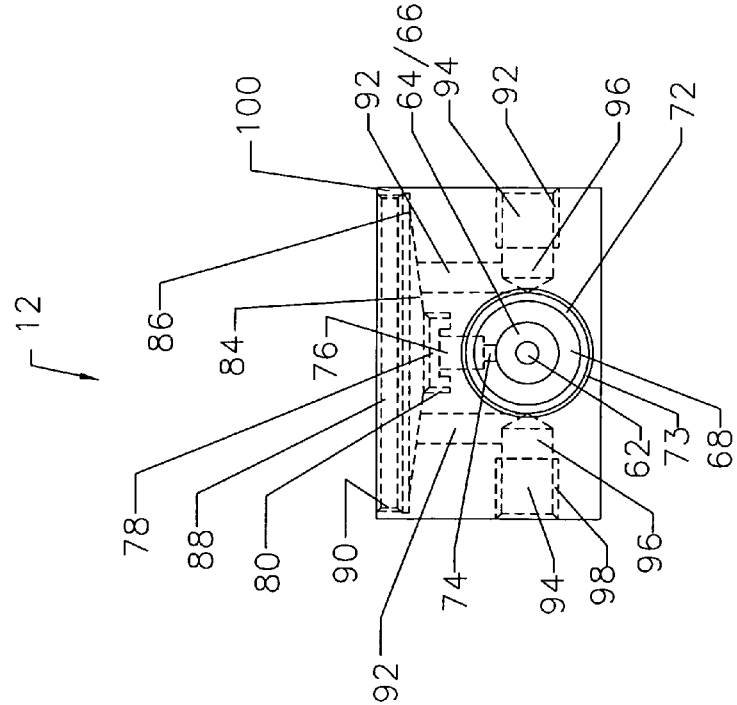

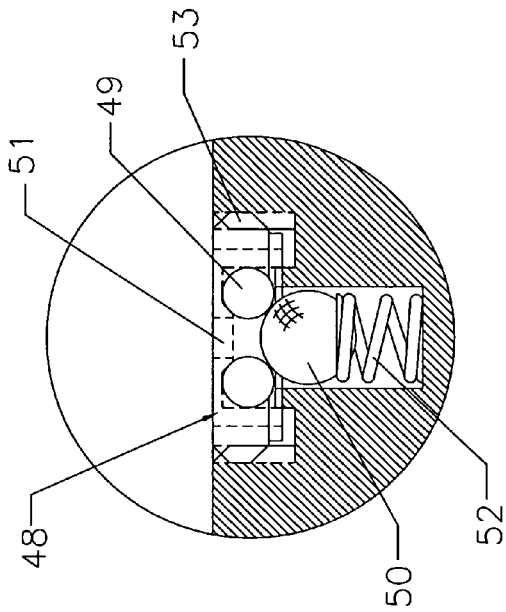
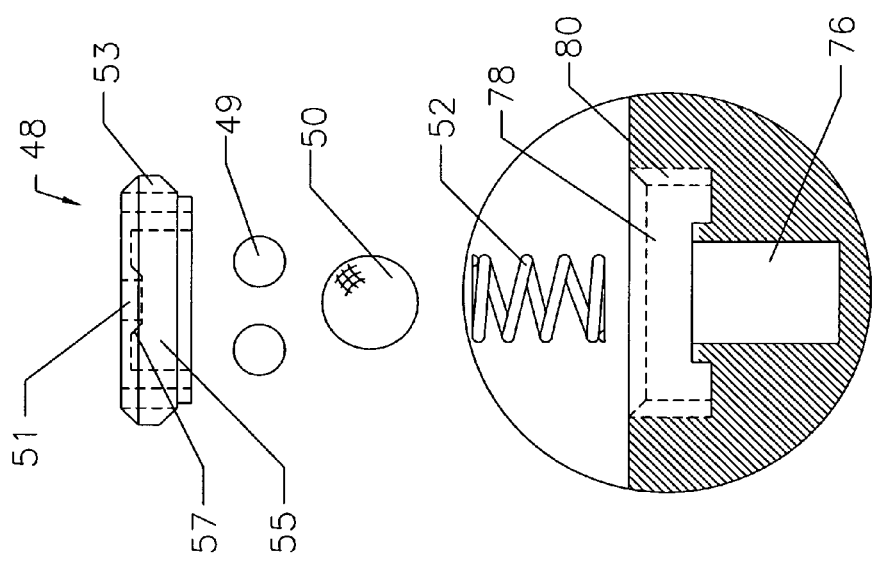
FIG 6
FIG 7

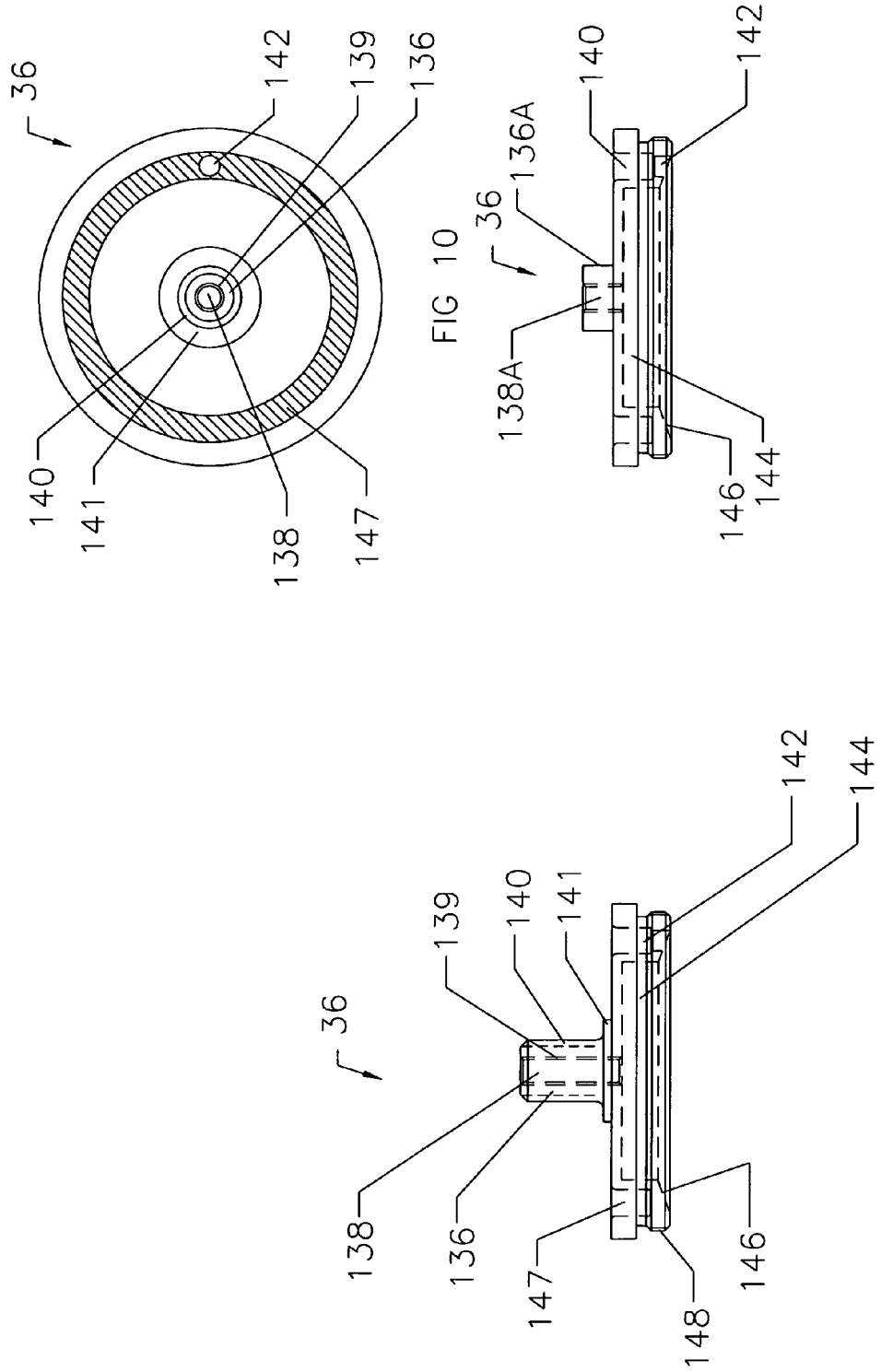

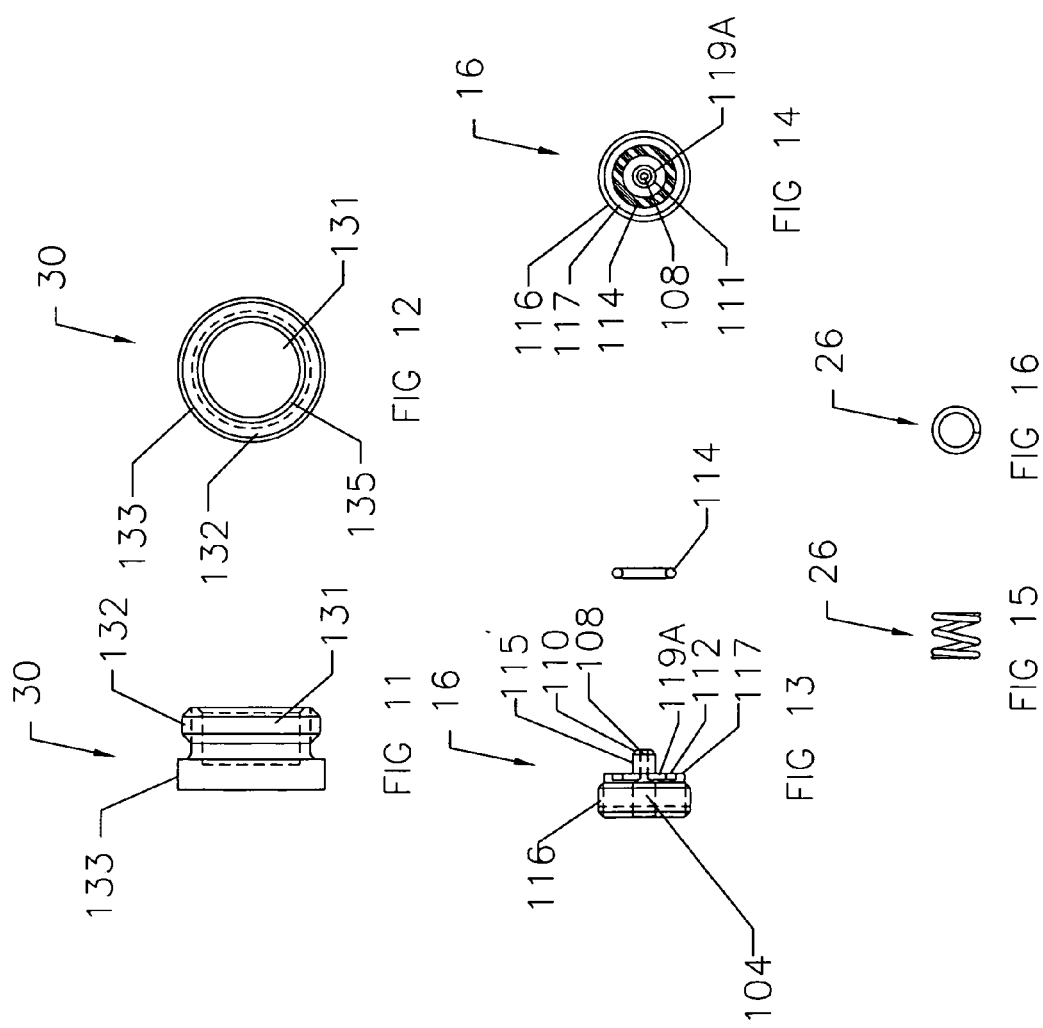

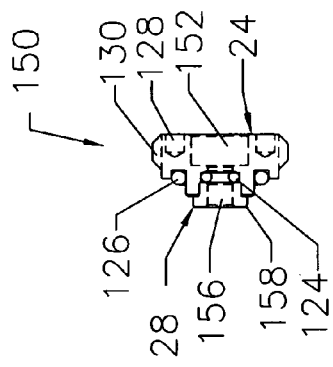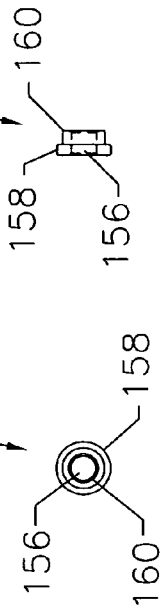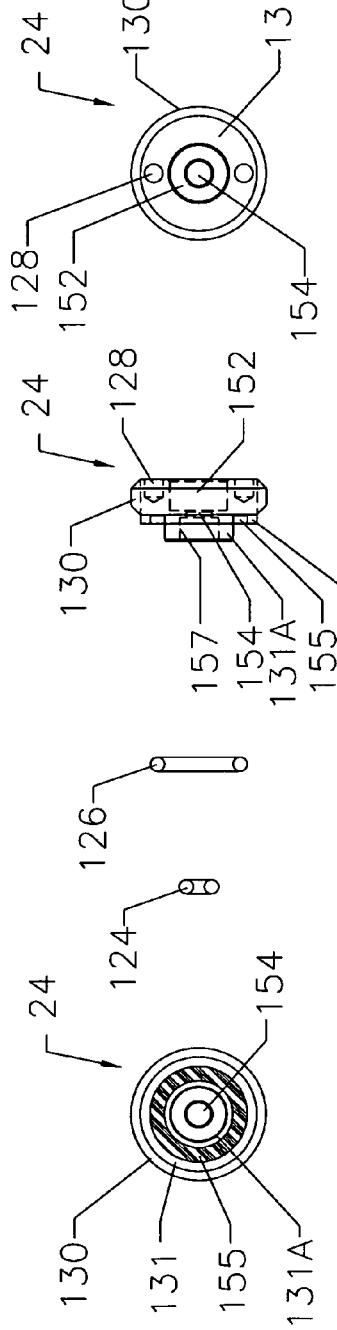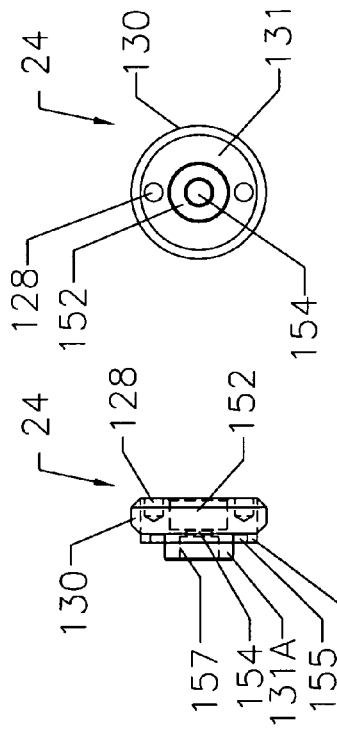

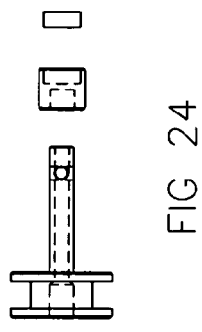
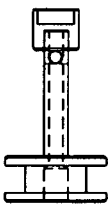
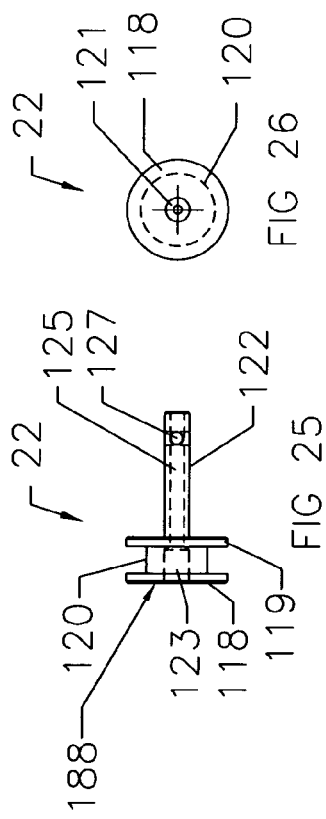
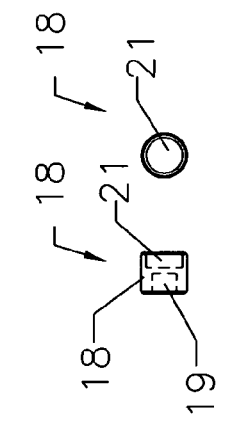
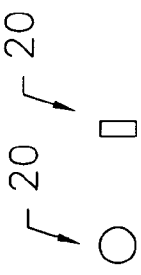

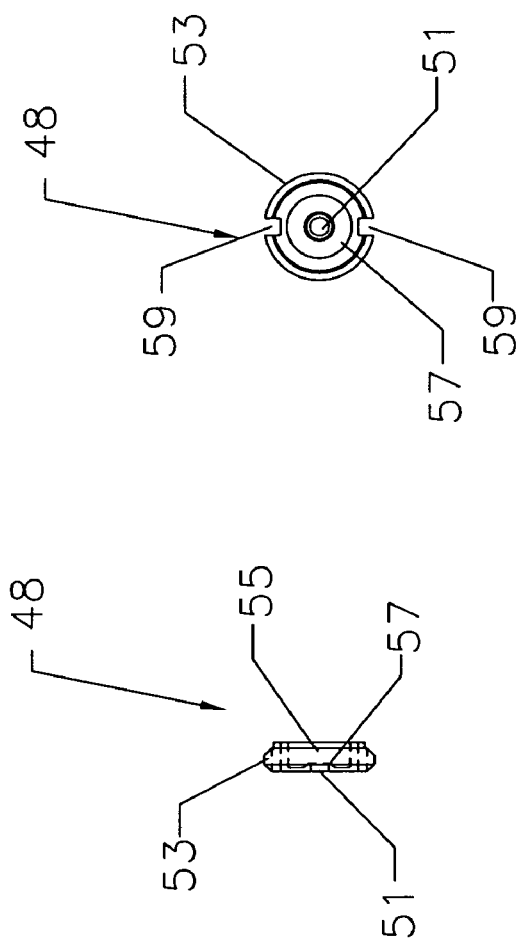

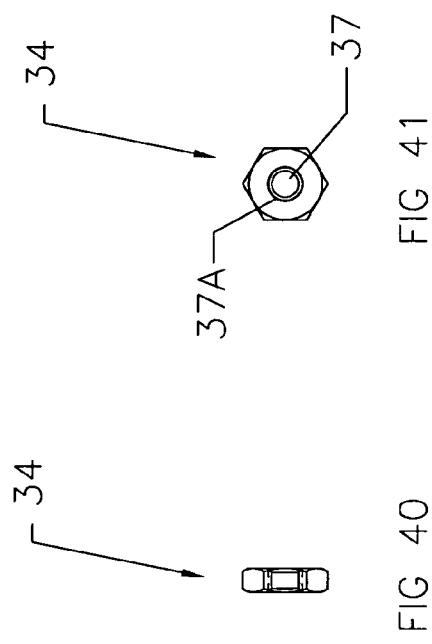
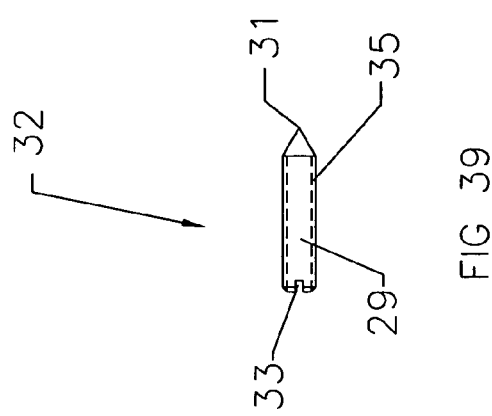

HIGH PRESSURE INLET REGULATOR

CROSS-REFERENCE TO RELATED APPLICATION

This is a regular utility application that claims the benefit of U.S. Provisional Application No. 60/873,870 filed Dec. 7, 2006, the contents of which are incorporated in their entirety herein by reference.

BACKGROUND OF THE INVENTION

1. Field of the Invention

The invention relates generally to valves used to regulate fluid pressure in a system and more particularly to valves employing a diaphragm to regulate high fluid pressures.

2. Statement of the Prior Art

Current miniature pressure regulating valves can only handle relatively small reductions in pressure. In addition, many such valves have problems with valve seats. It is difficult to obtain the geometries and finishes necessary to maintain a good valve seat. What is described herein solves this problem by using either a ball valve or a poppet valve in conjunction with a diaphragm to regulate pressure. The invention also provides an apparatus to reduce very high pressures to lower pressures while regulating the pressure flow of fluids and/or gases.

SUMMARY OF THE INVENTION

In one aspect of the invention, a two-stage regulator uses a combination of a spring actuated piston with a poppet valve in a first stage and diaphragm in a second stage to regulate fluid pressure in a system. In an alternate embodiment, a ball valve is used in combination with the diaphragm to regulate pressure. In another aspect of the invention, a two-stage valve uses a combination of poppet valves and a diaphragm to regulate fluid pressure in a system. Each embodiment provides excellent valve seating characteristics and sustainable pressure regulation over a wide range of pressures. These and other objects and features of the invention will be apparent from a review of the drawings and a reading of the following detailed description of the invention.

BRIEF DESCRIPTION OF THE DRAWINGS

FIG. 1 is an elevational view of a two-stage diaphragm valve according to one embodiment of the invention.

FIG. 2 is a side elevational view of a two-stage regulator body showing an inlet port and piston chamber in phantom according to one embodiment of the invention.

FIG. 3 is a side elevational view of a two-stage regulator body showing the inlet port and outlets (in phantom) according to one embodiment of the invention.

FIG. 4 is a top plan view of a two-stage regulator body showing inlet, outlets and piston chamber in phantom according to one embodiment of the invention.

FIG. 6 is a side view of a second stage ball valve subassembly according to one embodiment of the invention.

FIG. 7 is an exploded view of a second stage ball valve subassembly according to one embodiment of the invention.

FIG. 8 is a side elevational view of a regulator body cap with a long cap stem according to one embodiment of the invention.

FIG. 9 is a side elevational view of a regulator body cap with a short cap stem according to another embodiment of the invention.

FIG. 10 is a bottom view of a regulator body cap according to one embodiment of the invention.

FIG. 11 is a side view of a piston cap according to one embodiment of the invention.

FIG. 12 is a top view of a piston cap according to one embodiment of the invention.

FIG. 13 is an exploded view of a filter and filter o-ring subassembly according to one embodiment of the invention.

FIG. 14 is a bottom view of a filter according to one embodiment of the invention.

FIG. 15 is a side view of a piston spring according to one embodiment of the invention.

FIG. 16 is a top view of a piston spring according to one embodiment of the invention.

FIG. 17 is an exploded view of a gland nut and o-ring subassembly according to one embodiment of the invention.

FIG. 18 is a bottom view of a gland nut according to one embodiment of the invention.

FIG. 19 is a top view of a gland nut according to one embodiment of the invention.

FIG. 20 is a side view of an o-ring retainer according to one embodiment of the invention.

FIG. 21 is a top view of an o-ring retainer according to one embodiment of the invention.

FIG. 22 is a side view of a gland nut/o-ring subassembly according to one embodiment of the invention.

FIG. 23 is a side view of a piston/valve poppet subassembly according to one embodiment of the invention.

FIG. 24 is an exploded view of a piston/valve poppet subassembly according to one embodiment of the invention.

FIG. 25 is a side view of a piston according to one embodiment of the invention.

FIG. 26 is a top view of a piston according to one embodiment of the invention.

FIG. 27 is a side view of a valve poppet according to one embodiment of the invention.

FIG. 28 is a top view of a valve poppet according to one embodiment of the invention.

FIG. 29 is a side view of a poppet valve plug according to one embodiment of the invention.

FIG. 30 is a top view of a poppet valve plug according to one embodiment of the invention.

FIG. 31 is a side view of a ball valve seat according to one embodiment of the invention.

FIG. 32 is a bottom view of a ball valve seat according to one embodiment of the invention.

FIG. 33 is a side view of a ball valve spring according to one embodiment of the invention.

FIG. 34 is a plan view of a ball valve according to one embodiment of the invention.

FIG. 39 is a side view of a valve adjustment screw according to one embodiment of the invention.

FIG. 40 is a side view of a locking nut according to one embodiment of the invention.

FIG. 41 is a top view of a locking nut according to one embodiment of the invention.

DETAILED DESCRIPTION

Figure 5:
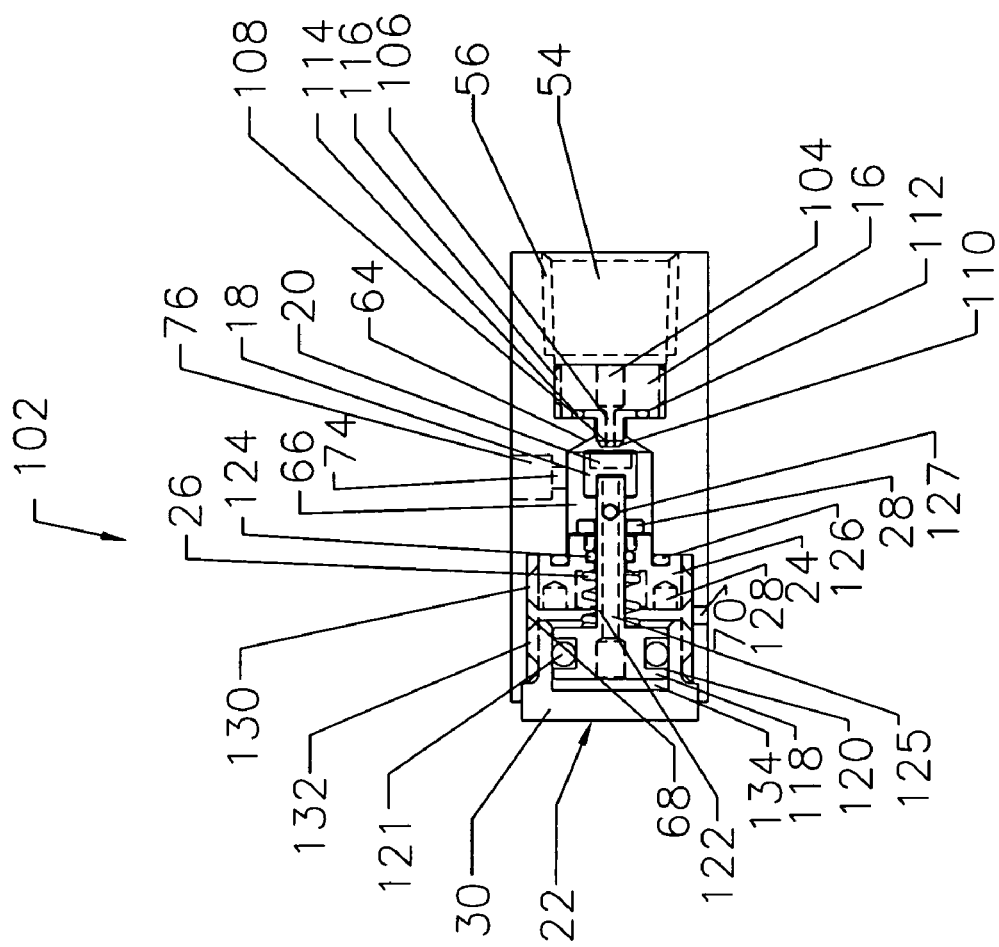
FIG. 5 is a side view of the inlet/piston chamber/piston sub-assembly according to one embodiment of the invention.

In one aspect of the invention, as shown in FIG. 1, a two-stage regulator 10 combines an elastomeric diaphragm and a piston/poppet valve assembly to regulate pressure. In a first stage, the regulator comprises a regulator body 12, an inlet port 14, a filter 16, a valve poppet 18 with a polymeric poppet plug 20, a piston 22, a gland nut 24, a piston spring 26, an o-ring retainer 28, and a piston cap 30 along with a series of o-rings, described more fully below.

A second stage comprises a valve adjustment screw 32, locking nut 34, regulator body cap 36, plunger 38, Bellville washers 40, spring cup 42, diaphragm 44, valve actuator 46, valve seat 48, ball 50 and ball valve spring 52. The second stage also incorporates a set of o-rings as described below.

Referring to FIGS. 2-4, regulator body 12 includes an inlet port 54 with optional threading 56 about the perimeter of the port for receiving adapters (not shown) from high pressure fluid sources. Port 54 is in fluid communication with filter port 58 that also can have filter port threading 60 to receive filter 16. A connector port 62 connects filter port 58 to gland nut port 66, which is connected to, and in fluid communication with, piston port 68. The connection point between connector port 62 and gland nut port 64 can be tapered to ensure proper alignment of piston/valve poppet subassembly 162 within gland nut port 64 as shown in FIGS. 1 and 24.

Fluid communication between the first stage and the second stage is provided by stage connector port 74. Connector port 74 connects gland nut port 64 and ball valve port 76. Ball valve port 76 connects to valve seat port 78, which may include optional valve seat port threading 80 to secure valve seat 48. Valve seat port 78 connects to diaphragm port 88, which includes a tapered bottom 84 that allows diaphragm 44 to flex downward relative to downward pressure settings produced by the second stage assembly components and provides a bottom support for diaphragm 44 to ensure protection of the diaphragm's physical and functional integrity.

Diaphragm port 88 also includes a flat portion 86 about the periphery of the port to provide structural support for the diaphragm when placed in the regulator body 12. Diaphragm port 88 can also be provided with diaphragm port threading 90 to engage with threading on regulator body cap 36. Threading 90 is formed in a body upper wall 100 that may be annular in shape as shown.

Extending down and in fluid communication with diaphragm port 88 is at least one outlet connector port 92. As shown in FIG. 3, two or more such ports may be formed or provided in regulator body 12. Connector port 92 connects to and is in fluid communication with outlet port 94 via an internal portion 96. Outlet port 94 may include outlet port threading 98 to engage likewise threaded attachments (not shown). To register the internal pressure against ambient pressure, vent 70 is formed in regulator body 12 so as to be in fluid communication with piston bore 68.

Referring to FIG. 5, the components of the first stage 102 are shown. Torqued into filter port 58 is filter 16. An annular channel 112 is formed on a bottom surface of filter 16 to create a seal between regulator housing 12 and filter 16 to prevent fluid flowing through filter 16 from being directed into filter port 58. A filter o-ring 114 fits within channel 112 and provides the seal between filter 16 and the bottom of filter port 58. Annular surfaces 117 and 119a form a face of filter 16 that interfaces with the bottom of filter port 58.

Referring to FIGS. 13-15, filter 16 has a large fluid bore 104 that reduces down in diameter at a point 111 to a narrow bore 106 formed in a cylindrical shaft 115 that extends from the body of filter 16 and that ends with filter opening 108. Shaft 115 is dimensioned to fit within connector port 62. Filter 16 further has a tapered tip 110 that enhances the seal and alignment between tip 110 and polymeric insert 20. Filter 16 may have perimeter threading 166 that engages threading 60 of filter port 58.

Referring to FIGS. 5 and 23-30, contained within piston port 68 is piston 22 that has a piston head 188, which includes an annular channel 120 for receiving piston o-ring 121. The formation of channel 120 creates a top portion 118 and a bottom portion 119 of piston head 188. O-ring 121 creates a seal between piston head 188 and piston port 68. Attached to head 188 is piston shaft 122. Formed within and extending through piston shaft 122 is piston bore 125. Bore 125 may be formed with a radially-enlarged bore segment 123 within piston head 188 as shown in FIG. 5. Proximal to a distal end of shaft 122 is shaft aperture 127, which enables piston bore 121 to be in fluid communication with gland nut bore 66.

Attached to the distal end of shaft 122 via friction fit, interference fit or other like means is poppet valve 18 that has a polymeric insert 20 set into a poppet valve bore 21 formed in an end of valve 18. Insert 20 is designed to register against tip 110 of filter 16. The combination of piston 22, poppet valve 18 and insert 20 forms piston/poppet valve subassembly 162 shown in FIGS. 23 and 24.

Piston 22 is secured in piston bore 68 with piston cap 30 shown in FIGS. 1, 5, 11 and 12. Piston cap 30 is secured to piston bore 68 with piston cap threading 132 that engages piston port threading 72. Positioned about piston shaft 122 is piston spring 26. A proximal end of spring 26 registers against bottom annular segment 119 of piston head 188 while a distal end registers against the bottom of a piston spring bore 152 formed in a top side of gland nut 24. Referring to FIGS. 17-22, gland nut 24 is secured in gland nut port 66 and a bottom end of piston port 68 with gland nut threading 130 that engages piston port threading 72.

Approximately concentric with piston spring bore 152 is piston shaft bore 154 dimensioned to receive in sliding engagement piston shaft 122. Extending from gland nut 24 is gland nut shaft 131a dimensioned to fit within gland nut port 66. Formed in shaft 131a is o-ring support bore 157 that is in fluid communication with piston shaft bore 154 and creates a seat for shaft o-ring 124. Shaft o-ring 124 creates a sliding seal between the outer perimeter of piston shaft 122 and gland nut 24. O-ring 124 is maintained in position with o-ring retainer 28, a shaft 160 extending from the body of retainer 28 fits within support bore 157 via friction fit, adhesive or other like securing means. A retainer head 158 of retainer 28 registers against a bottom surface of gland nut 24. Retainer 28 is formed with a retainer bore 156 dimensioned to receive piston shaft 122 in sliding engagement. The combination of gland nut 24, retainer 28 and their associated o-rings form gland nut/o-ring subassembly 150 shown in FIG. 22.

Formed on a bottom surface of gland nut 24 is an annular gland nut o-ring channel 155 configured to received gland nut o-ring 126, which creates a seal between gland nut 24 and the bottom surface of piston port 94. Formed in a top surface of gland nut 24 are tool bores 128, which enable gland nut 24 to be torqued into piston port 68 with a two-tine torqueing tool.

With respect to the described first stage 102, pressure reduction is accomplished in accordance with the following mechanism. Pressurized fluid or gas enters gland nut port 66 via filter 16. The pressurized fluid flows into gland nut port 66 and into connector port 74 that connects in fluid communication first stage 102 to the second stage. A portion of the pressurized fluid and/or gas flows into aperture 127 and along piston bore 125. The pressurized fluid and/or gas flows into piston cavity 134 defined by cap 30 and piston top portion 118. The introduction of pressurized fluid and/or gas urges piston 188 against poppet valve 18, which urges insert 20 toward tip 110 of filter 16. The pressure overcomes the axial tension of piston spring 26 that is tensioned to accommodate the desired pressure range. As insert 20 and poppet valve 18 move toward filter 16, the reduction in the gap formed between insert 20 and filter tip 110 results in reduced fluid flow and reduced pressure, which communicates with and is further adjusted by the pressure set by the second stage.

Referring now to FIGS. 6 and 7, a ball valve assembly in the second stage is shown. The assembly includes ball 50 urged against valve seat 48 via ball valve spring 52 that has a pre-loaded axial tension. Valve seat 48 includes a valve seat bore 55 dimensioned to receive a valve seat o-ring 49 positioned in bore 55. An annular channel is formed on a bottom surface of bore 55 to help secure and center o-ring 49 in valve seat 48. Valve seat 48 further includes a secondary valve seat bore 51 substantially concentric with valve seat bore 55 that provides fluid communication through the valve seat. The main components of the ball valve subassembly are shown throughout FIGS. 31-34.

Referring to FIGS. 31 and 32, formed on a perimeter of valve seat 48 is valve seat threading 53 configured to engage valve seat bore threading 80 formed in the wall of valve seat port 78. Valve seat 48 may include a pair of slots 59 (shown in FIG. 32), to receive a two-tine torque tool to torque valve seat 48 into valve seat port 78. Valve spring 52 registers against ball 50 at a top end and against a bottom surface of ball valve port 76 at a bottom end. Valve port 76 is dimensioned to be slightly larger in diameter than ball 50 to allow ball 50 to freely move along at least part of the length of valve port 76. Spring 52 urges ball 50 into a sealing arrangement with o-ring 49 so as to seal off fluid communication between ball valve port 76 and secondary valve seat bore 51, which, in turn, effectively prevents fluid communication between ball valve port 76 and diaphragm port 88.

Figure 46:
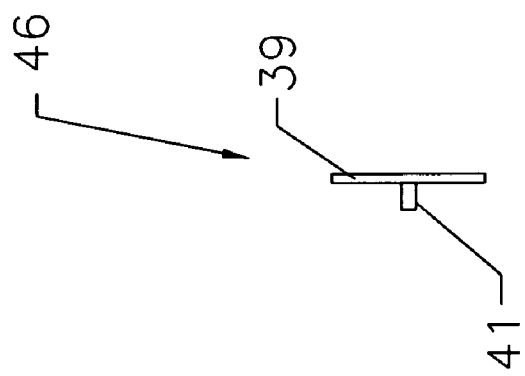
FIG. 46 is a side view of a valve actuator according to one embodiment of the invention.
Figure 47:
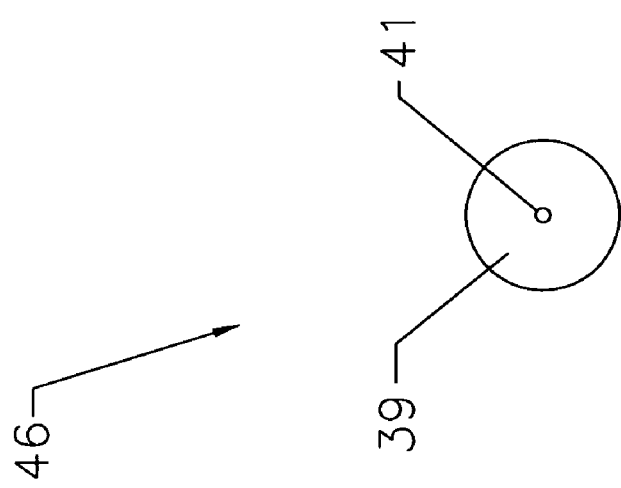
FIG. 47 is a bottom view of a valve actuator according to one embodiment of the invention.

Referring to FIGS. 1, 46 and 47, positioned above valve seat 48 is valve actuator 46 that includes a generally circular disk-shaped body 39 with a downwardly projecting actuator shaft 41 dimensioned to fit within secondary valve set bore 51. Shaft 41 is dimensioned so as not to completely occlude valve set bore 51 when urged into bore 51. A distal tip of shaft 41 registers against ball 50 and transmits pressure imparted on actuator 46 by diaphragm 44 that contacts a top surface of actuator 46.

Figure 37:
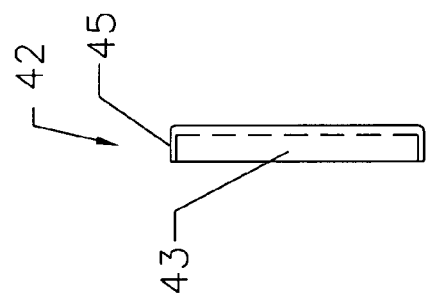
FIG. 37 is a side view of a spring cup according to one embodiment of the invention.
Figure 38:
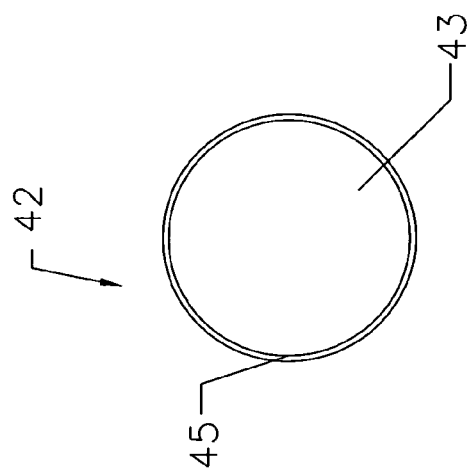
FIG. 38 is a top view of a spring cup according to one embodiment of the invention.
Figure 42:
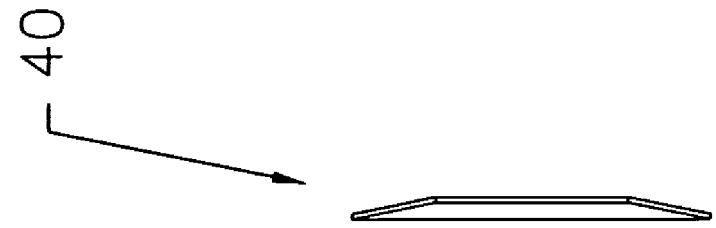
FIG. 42 is a top view of a Bellville washer according to one embodiment of the invention.
Figure 43:
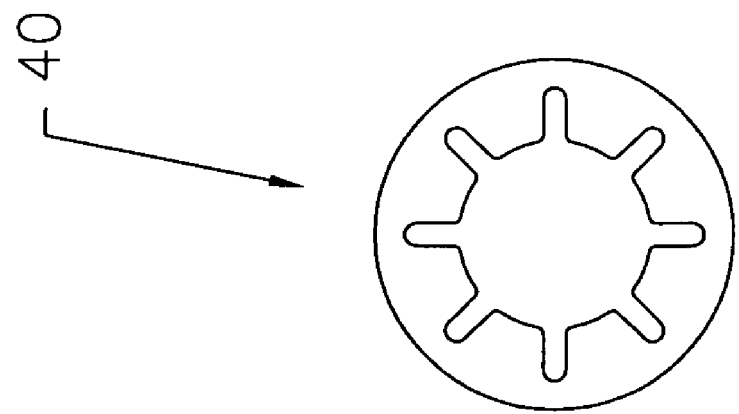
FIG. 43 is a side view of a Bellville washer according to one embodiment of the invention.
Figure 44:
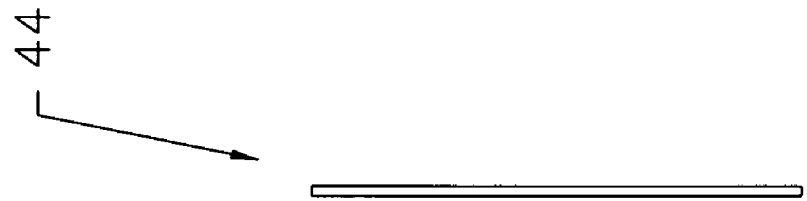
FIG. 44 is a top view of a diaphragm according to one embodiment of the invention.
Figure 45:
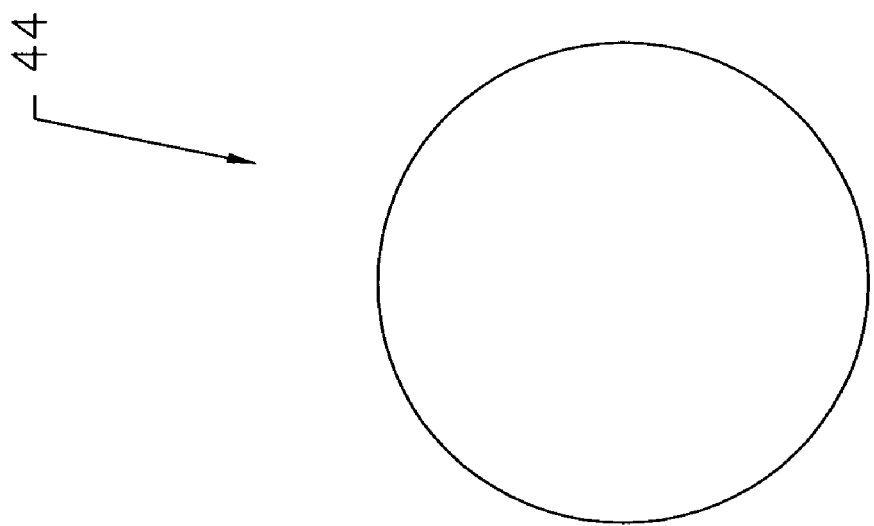
FIG. 45 is a side view of a diaphragm according to one embodiment of the invention.

As shown in FIGS. 44 and 45, diaphragm 44 is made from an elastomeric material and is positioned in diaphragm bore 88 so that the perimeter of the substantially circular diaphragm sits on flat portion 86. Referring to FIGS. 1, 37 and 38, positioned above diaphragm 44 is spring cup 42. Spring cup 42 is generally circular in shape with a substantially flat bottom surface and an annular wall 45 that defines a cup cavity 43 configured to receive and support Bellville washers 40 shown in FIGS. 42 and 43. Annular wall 45 of spring cup 42 is dimensioned to fit within a substantially circular cap cavity 144. The combination of spring cup 42 and cavity 144 contain Bellville washers 40 in a concentric relationship with the other components of the second stage.

Figure 35:
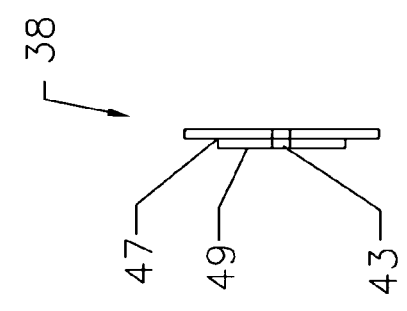
FIG. 35 is a side view of a plunger according to one embodiment of the invention.
Figure 36:
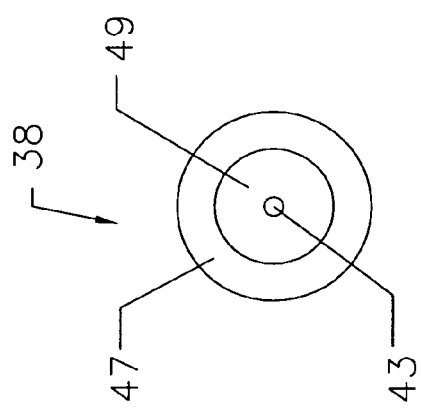
FIG. 36 is a bottom view of a plunger according to one embodiment of the invention.

Referring to FIGS. 1, 35 and 36, positioned above the top-most Bellville washer is plunger 38 that has a generally circular top section 47 and a bottom section 49 having a smaller diameter than top section 47. The juncture of the outer edge of bottom section 49 and top section 47 forms an annular shoulder. Bottom section 49 is dimensioned to fit within a substantially circular gap in the top-most Bellville washer 40, which ensures plunger 38 remains concentric with the washers 40 and the other components of the second stage. An aperture 43 is formed substantially in the center of the plunger to receive a tip 31 of set screw 32.

Referring to FIGS. 1 and 8-10, body cap 36 is generally circular in shape with an optional annular channel 147 formed in a top surface to provide a means for product weight reduction. A vent bore 142 is formed in cap 36 to provide access to ambient pressure as a reference point for the regulator's internal pressure. Cap 36 has cap threading 148 provided around a bottom section of the cap. A bottom-most end of cavity 144 transitions into a flanged surface 146 to provide a relatively edge-free surface for diaphragm 44 to contact regardless of the particular pressure setting of the second stage. This ensures diaphragm 44 will not shear or tear when in contact with cap 36.

Extending upwardly from cap 36 is cap stem 136 (long form shown in FIG. 8) or 136a (short form shown in FIG. 9). An optional stem flange 141 may be formed at a base of the stem to provide structural support for stem 136 or to provide a further surface for engagement of the regulator to a larger assembly. An exterior surface of stem 136 is provided with stem threading 140 that engages locking nut threading 37a. An interior surface of stem 136 is also provided with internal stem threading 139 that engages set screw threading 35 formed on an exterior surface of set screw 32 shown in FIG. 39). Cap 36 has a central cap bore 138 in fluid communication with cavity 144. Bore 138 is dimensioned to receive set screw 32 that is torqued into stem 136/136a and set by torqueing locking nut 34 onto set screw 32 via threaded locking nut aperture 37 dimensioned to receive set screw 32 until nut 34 contacts the top of cap stem 136 or 136a.

As shown in FIG. 39, set screw 32 has a main cylindrical body 29 with exterior set screw threading 35 extending substantially about the length of set screw 32. A slot 33 is formed in a top of set screw 32 to provide a means to torque the set screw with a screw driver or other flat-bladed implement. A bottom end of set screw 32 may be formed so as to taper down to a point 31. This allows the tip of set screw 32 to precisely engage aperture 43 of plunger 38.

Having thus described the components of Applicants novel pressure regulator, a method of operation so as to regulate and reduce very high pressures to much lower pressures will now be described. To operate the regulator, fluid and/or gas is introduced into inlet 54 at a pressure ranging from about 1 psi to about 8000 psi. The fluid travels through filter 16 and into gland nut port 96 and enters stem aperture 127. The fluid then travels through piston bore 121 into piston cavity 134. The high pressure counters the force imparted on piston 22 by piston spring 26 so that piston 22 moves towards tip 110 of filter 16. If tip 110 becomes engaged with polymeric disk 20, the fluid flow will be arrested.

The pressure of the fluid flowing out of tip 110 combined with the axial force applied by spring 26 against piston 22, however, should always be slightly greater than the pressure realized in piston cavity 134 so that the first stage should always remain open. The configuration of the first stage allows for a substantial reduction in the initial pressure of the fluid from as much as about 8000 psi down to 100 or 200 psi, which is the pressure exerted on ball 50 exclusive of the force exerted on ball 50 by ball valve spring 52.

At the initial introduction of fluid into the regulator, the full initial pressure is exerted against ball 50 until the fluid has flowed through piston 22 and into cavity 134. After the initial flow, the fluid pressure exerted on ball 50 is much reduced.

To set the second stage pressure, set screw 32 is adjusted to urge a desired pressure on plunger 38. That pressure is transmitted onto Bellville washers 40, which, in turn, exert the pressure onto spring cup 42. The pressure is then transmitted to diaphragm 44, which urges valve actuator 38 against ball 50 so as to lower ball 50 to allow fluid and/or gas to flow into diaphragm port 88 into connector port 92 and out exit port 94 at a controlled desired pressure.

While the present invention has been described in connection with one or more embodiments thereof, it will be apparent to those skilled in the art that many changes and modifications may be made without departing from the true spirit and scope of the invention. Accordingly, it is intended by the appended claim to cover all such changes and modifications as come within the true spirit and scope of the invention.

Having thus described my invention, what we claim as new and desire to secure by United States Letters Patent is:

1. A two-stage regulator comprising:
   a regulator body having a first stage section and a second stage section wherein the first stage section has portions defining a piston chamber, portions defining an inlet and portions defining at least one outlet, wherein the second stage is connected to, and in fluid communication with the first stage, and wherein the second stage has portions defining a diaphragm chamber;
   a piston having a piston head having portions defining a first piston bore and a piston shaft having portions defining a second piston bore and portions defining an aperture, wherein the first piston bore, the second piston bore and the aperture are in fluid communication with the piston chamber, and wherein the piston is positioned in the piston chamber; and,
   a diaphragm positioned in the diaphragm chamber.

2. The regulator of claim 1 further comprising a ball valve assembly positioned in the second stage comprising a ball, a ball valve spring, and a valve seat having a central valve seat orifice, wherein the ball valve spring registers against the ball valve at one end, and registers against the second stage at a second end, and wherein the valve seat registers against the ball, and is secured to the second stage to retain the ball in the second stage.

3. The regulator of claim 2 further comprising an actuator having a pin extending from a bottom surface, wherein the actuator is positioned between the diaphragm and the ball valve, and registers against the diaphragm on one end and registers against the ball valve, via the pin that passes through the valve seat orifice, on the other end.

4. The regulator of claim 3 further comprising:
   a spring cup having a bottom an a perimeter wall extending from the bottom wherein the bottom and wall define a spring cup cavity; and wherein the bottom registers against the diaphragm; and,
   at least one Bellville washer having a central orifice, wherein the Bellville washer is dimensioned to fit within the spring cup cavity, and wherein the washer registers against the spring cup bottom.

5. The regulator of claim 4 further comprising a plunger having a top section, a bottom section adjacent the top section, and an aperture formed substantially in the center of the top section wherein the bottom section is dimensioned to fit within the central orifice of the at least one Bellville washer and a bottom face of the top section registers against a top of the Bellville washer.

6. The regulator of claim 5 further comprising a body cap having portions defining a centralized orifice, wherein the body cap is secured to a top end of the regulator body.

7. The regulator of claim 6 further comprising a valve adjustment screw having a tip dimensioned to fit within and register against the aperture of the plunger, and wherein the adjustment screw is dimensioned to fit the centralized orifice of the body cap.

8. The regulator of claim 7 further comprising a locking nut having a threaded orifice dimensioned to receive the adjustment screw, wherein the nut is threaded onto the set screw until the nut registers against the body cap to lock the set screw in a selected vertical orientation relative to the body cap.

9. The regulator of claim 8 further comprising a piston spring positioned about the piston shaft, wherein one end of the spring registers against the piston head.

10. The regulator of claim 9 further comprising a gland nut having portions defining a central gland nut bore for receiving the piston shaft, wherein the gland nut is secured in the piston chamber, and wherein an end of the piston spring registers against the gland nut.

11. The regulator of claim 10 further comprising an o-ring positioned within the gland nut bore and about the piston shaft, wherein the o-ring provides a sliding seal between the gland nut and the piston shaft.

12. The regulator of claim 11 further comprising a retainer having an orifice for receiving the piston shaft, wherein a side of the retainer registers against the gland nut and retains the o-ring within the gland nut.

13. The regulator of claim 12 further comprising:
   a poppet valve having a first side and a second side, wherein the first side has portions defining a piston bore for receiving a distal end of the piston shaft, and wherein the second side has portions defining a disk bore; and
   a disk dimensioned to fit within the disk bore.

14. The regulator of claim 13 further comprising a filter having a main body defining a first bore and a shaft extending from the main body, wherein the shaft defines a second bore in fluid communication with the first bore, wherein the two bores are in fluid communication with the piston chamber and wherein the filter is secured in the inlet.

15. The regulator of claim 14 further comprising a piston cap secured to the piston chamber wherein a gap is formed between the cap and the piston in fluid communication with the first piston bore.

16. The regulator of claim 6 further comprising a vent hole formed in the body cap wherein the vent hole is in fluid communication with the diaphragm chamber and the outside atmosphere of the regulator.

17. A two-stage regulator comprising:
   a regulator body having a first stage section and a second stage section wherein the first stage section has portions defining a piston chamber, portions defining an inlet and portions defining at least one outlet, wherein the second stage is connected to, and in fluid communication with the first stage, and wherein the second stage has portions defining a diaphragm chamber;
   a piston having a piston head having portions defining a first piston bore and a piston shaft having portions defining a second piston bore and portions defining an aperture, wherein the first piston bore, the second piston bore and the aperture are in fluid communication with the piston chamber, and wherein the piston is positioned in the piston chamber;

a diaphragm positioned in the diaphragm chamber;

a poppet valve having a first side and a second side, wherein the first side has portions defining a piston bore for receiving a distal end of the piston shaft.

18. A method of reducing fluid pressure comprising:

providing a regulator body having a first stage section and a second stage section wherein the first stage section has portions defining a piston chamber, portions defining an inlet and portions defining at least one outlet, wherein the second stage is connected to, and in fluid communication with the first stage, and wherein the second stage has portions defining a diaphragm chamber;

providing a piston having a piston head having portions defining a first piston bore and a piston shaft having portions defining a second piston bore and portions defining an aperture, wherein the first piston bore, the second piston bore and the aperture are in fluid communication with the piston chamber, and wherein the piston is positioned in the piston chamber;

providing a diaphragm positioned in the diaphragm chamber;

providing a poppet valve having a first side and a second side, wherein the first side has portions defining a piston bore for receiving a distal end of the piston shaft introducing a fluid having a first pressure into the first stage;

reducing the pressure with the piston; and, controlling the pressure of the fluid as it flows through the second stage and out the at least one outlet.

19. The method of claim 18 further comprising the steps of:

providing a ball valve assembly positioned in the second stage comprising a ball, a ball valve spring, and a valve seat having a central valve seat orifice, wherein the ball valve spring registers against the ball valve at one end, and registers against the second stage at a second end, and wherein the valve seat registers against the ball, and is secured to the second stage to retain the ball in the second stage; and, controlling the pressure in the second stage with the ball valve assembly and the diaphragm.

20. The method of claim 19 further comprising the steps of providing an adjustment screw for setting the pressure of the diaphragm in the second chamber.

* * * * *